(12) United States Patent
Wang et al.

(10) Patent No.: US 8,655,263 B2
(45) Date of Patent: Feb. 18, 2014

(54) METHOD, TERMINAL AND RADIO NETWORK CONTROLLER FOR SEARCHING FOR THE SINGLE FREQUENCY NETWORK CLUSTER

(75) Inventors: Xuelong Wang, Beijing (CN); Yu Ding, Beijing (CN); Shiyan Ren, Beijing (CN); Lei Mao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 864 days.

(21) Appl. No.: 12/669,658

(22) PCT Filed: Jul. 18, 2008

(86) PCT No.: PCT/CN2008/001337
§ 371 (c)(1),
(2), (4) Date: Feb. 23, 2010

(87) PCT Pub. No.: WO2009/012648
PCT Pub. Date: Jan. 29, 2009

(65) Prior Publication Data
US 2010/0173578 A1    Jul. 8, 2010

(30) Foreign Application Priority Data
Jul. 20, 2007   (CN) .......................... 2007 1 0119352

(51) Int. Cl.
*H04H 20/71* (2008.01)
(52) U.S. Cl.
USPC ..... 455/3.01; 455/151.2; 455/51.1; 455/13.2; 455/502; 455/71; 455/450; 455/105; 455/113; 455/150.1; 455/154.1

(58) Field of Classification Search
None
See application file for complete search history.

(56) References Cited

U.S. PATENT DOCUMENTS

| 2008/0311926 A1* | 12/2008 | Fischer et al. ............. 455/452.1 |
| 2009/0252070 A1* | 10/2009 | Connors et al. ............... 370/311 |
| 2009/0305712 A1* | 12/2009 | Franceschini et al. ........ 455/450 |
| 2010/0165901 A1* | 7/2010 | Kim ............................. 370/312 |

FOREIGN PATENT DOCUMENTS

| CN | 1533196 A | 9/2004 |
| CN | 1816208 A | 8/2006 |

OTHER PUBLICATIONS

International Search Report: PCT/CN2008/001337.

* cited by examiner

*Primary Examiner* — Yuwen Pan
*Assistant Examiner* — Fanghwa Wang
(74) *Attorney, Agent, or Firm* — Ladas & Parry LLP

(57) ABSTRACT

A method for searching for a broadcast/multicast single frequency network cluster, when a terminal needs to receive the broadcast/multicast service in the broadcast/multicast single frequency network cluster, the terminal synchronizes to a non broadcast/multicast single frequency network cell which is associated with the broadcast/multicast single frequency network cluster; and the terminal searches for the broadcast/multicast single frequency network cluster on the basis of the information indicated by the system information in the non broadcast/multicast single frequency network cell. So that the UE can search for the corresponding MBSFN cluster, and can receive the MBMS service in the searched MBSFN cluster.

8 Claims, 4 Drawing Sheets

METHOD, TERMINAL AND RADIO NETWORK CONTROLLER FOR SEARCHING FOR THE SINGLE FREQUENCY NETWORK CLUSTER

FIELD OF THE INVENTION

The present invention relates to the field of communication, and particularly to a method, User Equipment and Radio Network Controller for searching for a Broadcast and/or Multicast Single Frequency Network cluster.

BACKGROUND OF THE INVENTION

At present, a new special frame structure has been adopted at the physical layer in a base station to bear a Multimedia Broadcast/Multicast Service (MBMS) in the prior art, to further improve a transmission rate of the MBMS service in the 3GPP release 7.10

A schematic diagram of the special frame structure is shown in FIG. 1, and the frame structure includes one short slot and seven traffic slots, all of which are used for downlink transmission and transmitted in all directions. The short slot in the frame structure combines three special slots in the traditional frame structure, i.e. DwPTS, UpPTS and GP, into one slot with a length of 0.275 ms, and is used for transmitting a new type of burst data, such as transmission control information and the like. FIG. 2 shows the structure of the short slot, which includes a channel estimation code (i.e. a preamble) of 96 chips and data symbols of 256 chips. The seven traffic slots in the frame structure are used for transmitting the MBMS service. The structure of the traffic slot is shown in FIG. 3, and the traffic slot includes a channel estimation code (i.e. a preamble) of 96 chips and data symbols of 768 chips.

To ensure the compatibility with the existing system, i.e. to maintain the structure of slots in the existing traditional frame structure unchanged, another new frame structure is also adopted at the physical layer in the base station in the prior art to bear the MBMS service, and has a structure as shown illustratively in FIG. 4, which includes 3 idle slots, 1 slot TS0 and 6 traffic slots TS1-TS6. All of the slot TS0 and the slots TS1-TS6 are used for downlink transmission, while the three idle slots between the slot TS0 and slot TS1 are used for neither downlink transmission nor uplink transmission.

Based on the above two frame structures at the physical layer described above, when a Node B is instructed by a Radio Network Controller (RNC) to establish an MBMS over Single Frequency Network (MBSFN) cluster, two types of MBSFN clusters may be established, one of which is an MBSFN cluster where the MBMS service is transmitted based on the first physical layer frame structure described above, and the other is an MBSFN cluster where the MBMS service is transmitted based on the second physical layer frame structure described above.

In the prior art, there is neither a method for searching for a desired MBSFN cluster from the MBSFN clusters where the MBMS service is transmitted based on the above-described two types of physical layer frame structures, nor a method for receiving the MBMS service from the searched out MBSFN cluster, as a result, a User Equipment (UE) can receive the MBMS service from neither of the above-described two types of MBSFN clusters.

SUMMARY OF THE INVENTION

An embodiment of the present invention provides a method for searching for a Multimedia Broadcast/Multicast Service over Single Frequency Network (MBSFN) cluster, enabling a User Equipment to search for a corresponding MBSFN cluster.

An embodiment of the present invention further provides a method for receiving a Multimedia Broadcast/Multicast Service, enabling a User Equipment to receive an MBMS service from an MBSFN cluster.

Accordingly, an embodiment of the present invention further provides a User Equipment and a Radio Network Controller.

The method for searching for a Multimedia Broadcast/Multicast Service over Single Frequency Network cluster according to an embodiment of the present invention includes:

synchronizing a User Equipment with a non-MBSFN cell associated with an MBSFN cluster when the User Equipment is required to receive an MBMS service from an MBSFN cluster; and searching for the MBSFN cluster according to indication of system information in the non-MBSFN cell.

The method for receiving a Multimedia Broadcast/Multicast Service according to an embodiment of the present invention includes:

synchronizing a User Equipment with a non-MBSFN cell associated with an MBSFN cluster when the User Equipment is required to receive an MBMS service from an MBSFN cluster;

searching for the MBSFN cluster according to indication of system information in the non-MBSFN cell;

synchronizing the User Equipment with the searched out MBSFN cluster; and receiving the MBMS service from the MBSFN cluster in synchronization with the User Equipment.

A User Equipment according to an embodiment of the present invention includes:

a first synchronization unit, which is adapted to synchronize with a non-MBSFN cell associated with an MBSFN cluster when the User Equipment is required to receive an MBMS service from an MBSFN cluster; and a searching unit, which is adapted to search for the MBSFN cluster according to indication of system information in the non-MBSFN cell in synchronization with the first synchronization unit.

A Radio Network Controller according to an embodiment of the present invention includes:

a storage unit, which is adapted to store association information between a non-MBSFN cell and an MBSFN cluster; and an information distribution control unit, which is adapted to control a corresponding non-MBSFN cell to carry, in the distributed system broadcast information, information of the MBSFN cluster associated with the non-MBSFN cell, according to the stored association information.

In the embodiments of the present invention, the UE is synchronized with the non-MBSFN cell associated with the MBSFN cluster and searches for a corresponding MBSFN cluster according to indication of system information in the non-MBSFN cell in synchronization with the UE, subsequently, the UE is synchronized with the searched out MBSFN cluster, and receives the MBMS service from the MBSFN cluster in synchronization with the UE. Therefore, the embodiments of the present invention provide a method for searching for a desired MBSFN cluster from the proposed MBSFN clusters where the MBMS service is transmitted based on the above-described two types of physical layer frame structures, and a method for receiving the MBMS service from the searched out MBSFN cluster, thereby enabling the UE to search for the desired MBSFN cluster and receive the MBMS service from the searched out MBSFN cluster.

DETAILED DESCRIPTION OF THE EMBODIMENTS

Figure 1:
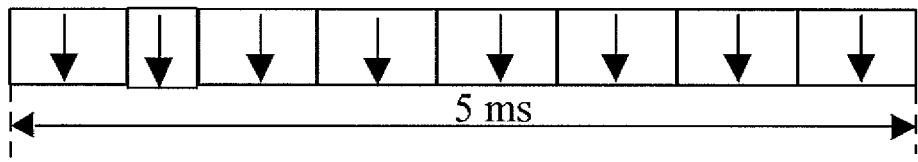
FIG. 1 is a schematic diagram showing the first type of physical layer frame structure in the prior art.
Figure 2:
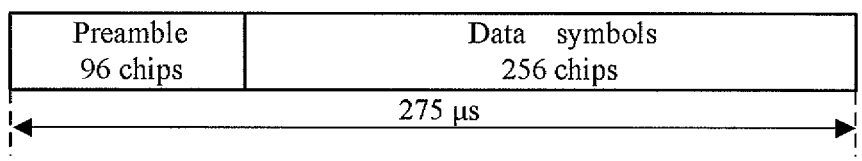
FIG. 2 is a schematic diagram showing the structure of a short slot in the first type of physical layer frame structure in the prior art.
Figure 3:
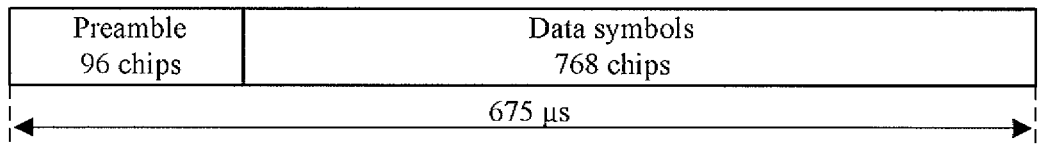
FIG. 3 is a schematic diagram showing the structure of a traffic slot in the first type of physical layer frame structure in the prior art.
Figure 4:
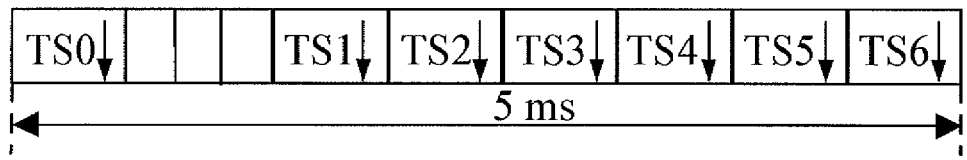
FIG. 4 is a schematic diagram showing the second type of physical layer frame structure in the prior art.

According an embodiment of the present invention, a UE is synchronized with a non-MBSFN cell associated with an MBSFN cluster and searches for a corresponding MBSFN cluster according to indication of system information in the non-MBSFN cell, subsequently, the UE is synchronized with the searched out MBSFN cluster, and receives an MBMS service from the MBSFN cluster in synchronization with the UE.

In an embodiment of the invention, an RNC notifies a Node B about an operation frequency and type of an MBSFN cluster when instructing the Node B to establish the MBSFN cluster, and notifies the Node B about the configuration of a Cell Parameter ID in the short slot or slot TS0 according to the type of the MBSFN cluster, as well as the configuration of a Cell Parameter ID in a traffic slot, however, it will be appreciated that the Cell Parameter ID in the traffic slot may be also configured when the common transmission channel is established. In the case of the first type of MBSFN cluster, i.e. the MBSFN cluster where the MBMS service is transmitted based on the first physical layer frame structure described above, the Cell Parameter ID in the short slot may be a code block ID allocated for the short slot in first type of MBSFN cluster by the RNC; and in the case of the second type of MBSFN cluster, i.e. the MBSFN cluster where the MBMS service is transmitted based on the second physical layer frame structure described above, the Cell Parameter ID in the slot TS0 may be a code block ID allocated for the slot TS0 in second type of MBSFN cluster by the RNC.

The RNC needs further to configure the channels in the MBSFN cluster as follows.

The channels in the first type of MBSFN cluster may be such configured that an MBMS point-to-multipoint transport channel (MTCH) is configured in the traffic slot, a Broadcast control channel (BCCH) and an MBMS point-to-multipoint control channel (MCCH) are primarily configured in the short slot, a Multiplex Subchannel (MSCH) or an MBMS notification identification channel (MICH) for the purpose of Discontinuous Reception (DRX) of the MBMS service may be further configured in the short slot, and the remaining channel resources in the short slot may be further used for bearing MTCH channel.

The channels in the second type of MBSFN cluster may be such configured that MTCH channels are configured in the traffic slots TS1-TS6, a BCCH channel and an MCCH channel are configured in the slot TS0, an MSCH channel or an MICH channel for the purpose of the DRX of the MBMS service is further configured in the slot TS0, and the remaining channel resources in the slot TS0 may be used for bearing the MTCH channel.

As can be seen from the above channel configuration, a synchronization channel is configured for neither of the above two types of MBSFN clusters by the RNC. Therefore, to enable the UE to receive the MBMS service from the MBSFN clusters, in the embodiment of the present invention, the UE is synchronized with a non-MBSFN cell associated with an MBSFN cluster and searches for the MBSFN cluster associated with the non-MBSFN cell according to indication of system information in the non-MBSFN cell, subsequently, the UE is synchronized with the searched out MBSFN cluster, and receives an MBMS service from the MBSFN cluster in synchronization with the UE. Therefore, the non-MBSFN cell and the MBSFN clusters are required to be associated with each other in the embodiment of the invention in a manner that an association table is provided in the RNC through an operation and maintenance platform so that the non-MBSFN cell is associated with the MBSFN clusters.

Figure 5:
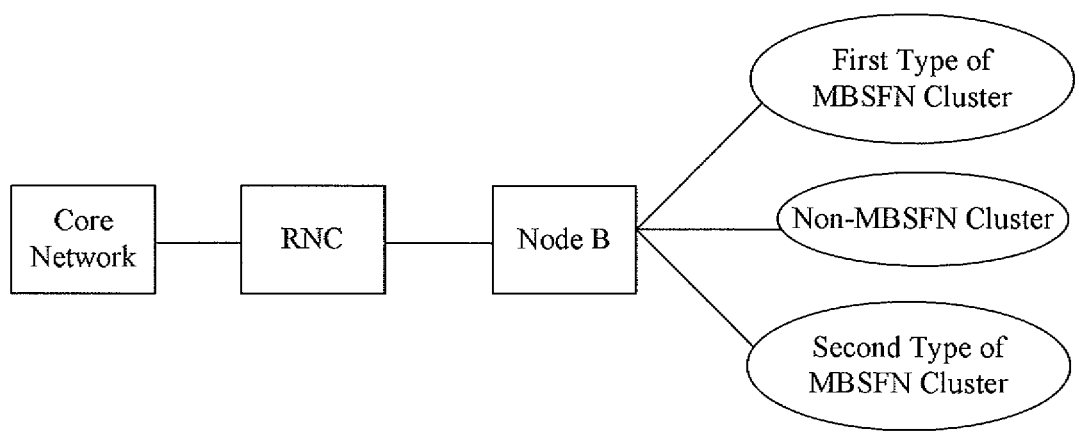
FIG. 5 is a diagram of the architecture including a non-MBSFN cell and the two types of MBSFN clusters according to an embodiment of the invention.

Referring to FIG. 5, a diagram of the architecture including a non-MBSFN cell and the two types of MBSFN clusters is shown, and it is desired to receive an MBMS service of one of the two types of MBSFN clusters (usually, the MBMS services transmitted in the MBSFN clusters are different from each other) via a UE in the coverage of a non-MBSFN cell. The implementation of receiving the MBMS service of one of the two types of MBSFN clusters by the UE in the coverage of a non-MBSFN cell is described in detail with reference to Tables 1 and 2 below.

For example, the correspondence relationship between the non-MBSFN cell and the associated MBSFN clusters is shown in Table 1, and information of the MBSFN clusters is shown in Table 2.

TABLE 1

Correspondence relationship between the non-MBSFN cell and the associated MBSFN clusters

| Non-MBSFN cell | MBSFN clusters associated with non-MBSFN cell |
| --- | --- |
| Non-MBSFN cell 1 | First type of MBSFN cluster<br>Second type of MBSFN cluster |

TABLE 2

Information of MBSFN clusters

| | Information of the first type of MBSFN cluster | Information of the second type of MBSFN cluster |
| --- | --- | --- |
| Cluster type | First type of MBSFN cluster | Second type of MBSFN cluster |
| Cluster operation frequency | Information of frequency of the first type of MBSFN cluster | Information of frequency of the second type of MBSFN cluster |
| Cell Parameter ID | Cell Parameter ID in short slot | Cell Parameter ID in slot TS0 |

Figure 6:
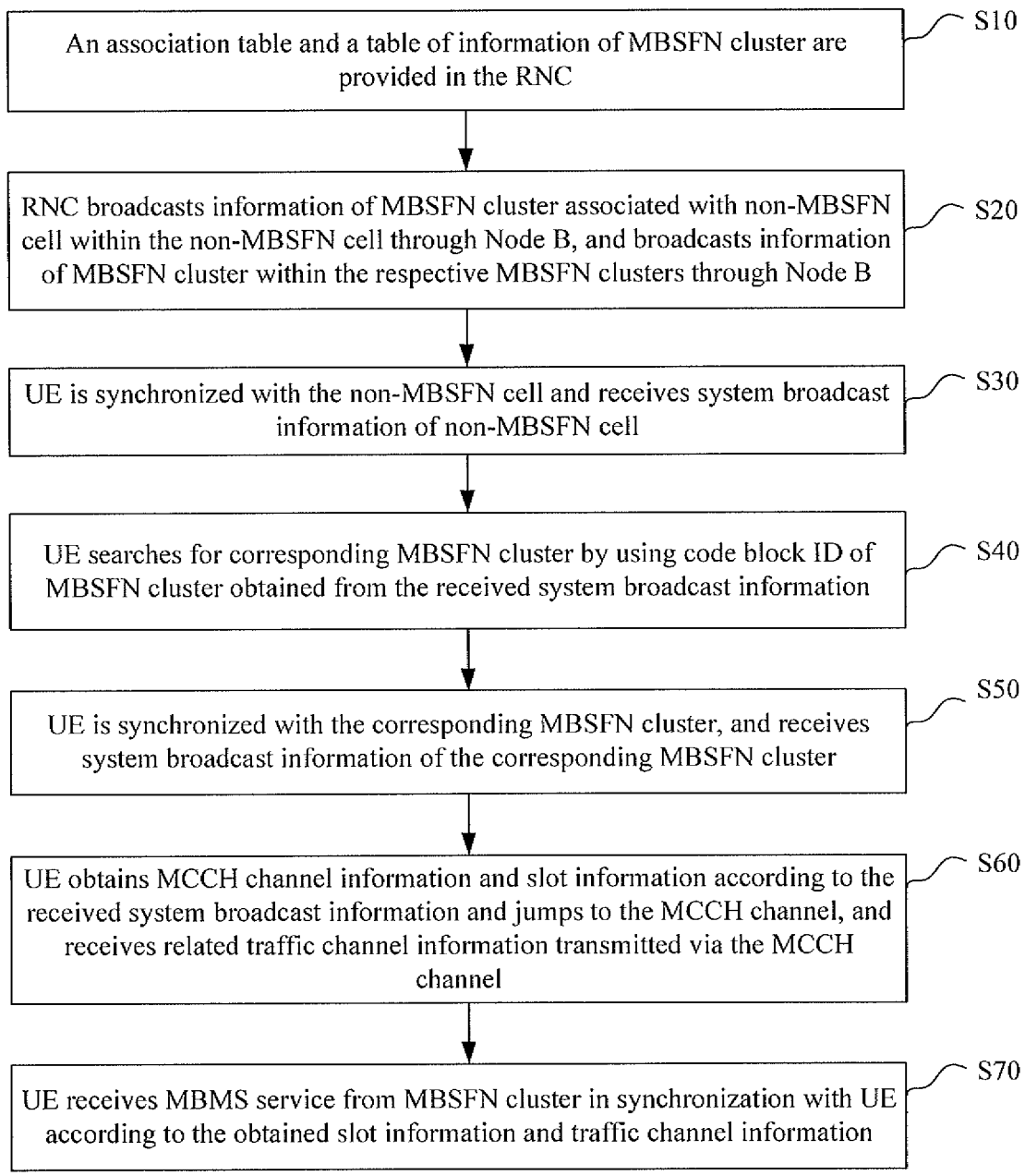
FIG. 6 is a flow chart in which a UE receives an MBMS service from an MBSFN cluster according to an embodiment of the invention.

For example, a plurality of MBMS services are initiated at the network side and the RNC is notified of the MBMS services through signaling. The RNC transmits one of the MBMS services through the first type of MBSFN cluster shown in Table 1 and the other of the MBMS services through the second type of MBSFN cluster shown in Table 1; further, it is desired to receive the MBMS service from the second type of MBSFN cluster by a UE in the coverage of the non-MBSFN cell 1. In this case, as shown in FIG. 6, the implementation of receiving the MBMS service from the second type of MBSFN cluster by the UE in the coverage of the non-MBSFN cell 1 is as follows.

S10: An association table as shown in Table 1 is provided in the RNC through an operation and maintenance platform. The Association table associates the non-MBSFN cell 1 with the first and second types of MBSFN clusters. Further, an table of information of the MBSFN clusters is provided in the RNC through the operation and maintenance platform as shown in Table 2, and contains: information of the type, frequency and Cell Parameter ID in the short slot of the first type of MBSFN cluster and information of the type, frequency and Cell Parameter ID in the slot TS0 of the second type of MBSFN cluster.

Further, the Cell Parameter IDs in the respective traffic slots in the MBSFN clusters need to be configured by the RNC according to properties of the Single Frequency Network.

S20: During the network operation, the RNC broadcasts system information SIB11 within the non-MBSFN cell 1 through the Node B, and the system information SIB11 contains information from the information table of the MBSFN clusters configured by the RNC, that is, the RNC broadcasts the type, frequency information and Cell Parameter ID in the short slot or slot TS0 of the MBSFN cluster associated with the non-MBSFN cell 1 within the non-MBSFN cell 1 through the Node B.

Further, the RNC broadcasts system information SIB3, SIB5 and SIB11 within the first type of MBSFN cluster through the Node B. The system information SIB3 contains information indicating the type of the MBSFN cluster; the system information SIB5 contains information of an MCCH channel of the MBSFN cluster and Cell Parameter IDs used for the respective traffic slots; and the system information SIB11 contains information from the information table of the MBSFN clusters, which includes the type, frequency information and Cell Parameter ID in the short slot of the first type of MBSFN cluster and the type, frequency information and Cell Parameter ID in the slot TS0 of the second type of MBSFN cluster.

Further, the RNC broadcasts system information SIB3, SIB5 and SIB11 within the second type of MBSFN cluster through the Node B. The system information SIB3 contains information indicating the type of the MBSFN cluster; the system information SIB5 contains information of an MCCH channel of the MBSFN cluster and Cell Parameter IDs used for the respective traffic slots; and the system information SIB11 contains information from the information table of the MBSFN clusters, which includes the type, frequency information and Cell Parameter ID in the short slot of the first type of MBSFN cluster and the type, frequency information and Cell Parameter ID in the slot TS0 of the second type of MBSFN cluster.

S30: The UE in the coverage of the non-MBSFN cell 1 is synchronized with the non-MBSFN cell 1 by receiving a synchronization signal of a normal carrier network. After the synchronization, the UE receives the system information SIB11 of the non-MBSFN cell 1, and obtains information of the first and second types of MBSFN clusters associated with the non-MBSFN cell 1 (i.e. the type, frequency information and Cell Parameter ID in the short slot or slot TS0 of the MBSFN clusters associated with the non-MBSFN cell 1) from the received system information SIB11.

S40: According to the service selection predetermined by the user, for example, if it is desired to receive the MBMS service of the second type of MBSFN cluster via the UE, the UE is synchronized with the second type of MBSFN cluster; then the UE searches for a corresponding MBSFN cluster according to the Cell Parameter ID in the slot TS0 of the second type of the MBSFN cluster which is obtained from the system information SIB11 received from the non-MBSFN cell 1.

Here, the process of searching for the MBSFN cluster using the Cell Parameter ID in the slot TS0 by the UE includes that: the UE receives wireless signals at the operation frequencies of the MBSFN clusters; the UE determines whether the Cell Parameter ID in the slot TS0 matches the received wireless signals at the operation frequencies of the MBSFN clusters, and in the present embodiment, the Cell Parameter ID matches successfully with the received wireless signal at the operation frequency of the second type of MBSFN cluster, but mismatches with the received wireless signals at the operation frequencies of other MBSFN clusters; then the UE determines the wireless signal at the operation frequency of the second type of MBSFN cluster as the target signal to receive, and searches for the corresponding MBSFN cluster according to the obtained Cell Parameter ID in the slot TS0 of the second type of MBSFN cluster.

As can be seen from the above, when the information of the MBSFN clusters obtained by the UE corresponds to at least two MBSFN clusters, the UE may determine the MBSFN to be searched for in such a manner that the UE determines the MBSFN cluster to be searched for according to the preset service selection made by the user and then searches for the corresponding MBSFN cluster.

Furthermore, the UE may determine the MBSFN cluster to be searched for in another manner that the UE determines the MBSFN cluster to be searched for according to its supported frame structure used for transmitting the MBMS service and then searches for the corresponding MBSFN cluster.

As shown in the above processing, the UE is synchronized with a non-MBSFN cell associated with an MBSFN cluster, and searches for the corresponding MBSFN cluster according to indication of system information in the non-MBSFN cell in synchronization with the UE, thereby enabling the UE to search for the corresponding MBSFN cluster.

S50: The UE is synchronized with the searched out second type of MBSFN cluster; after the UE is synchronization with the second type of MBSFN cluster, the UE receives the system information SIB3, SIB5 and SIB11 of the second type of MBSFN cluster by demodulating the information in the Cell Parameter ID (i.e. code block ID) in the slot TS0 of the second type of MBSFN cluster.

Here, if the UE determines that the wireless signal at the operation frequency of the second type of MBSFN cluster as the target signal for receiving, and receives wireless signals at the operation frequency of the second type of MBSFN cluster only, without receiving wireless signals at the operation frequency of the other MBSFN clusters, the UE has been successfully synchronized with the second type of MBSFN cluster.

S60: UE verifies the type of the current MBSFN cluster, i.e. verifying that the current MBSFN cluster is the second type of MBSFN cluster, according to the received system information SIB3 of the second type of MBSFN cluster, and obtains MCCH channel information and Cell Parameter ID information of the traffic slot of the second type of MBSFN cluster according to the received system information SIB5.

Further, the UE jumps to the MCCH channel according to the obtained MCCH channel information of the second type of MBSFN cluster, receives the Radio Bearer (RB) information and related traffic channel information transmitted in the MCCH channel according to the interested service, and obtains information of a specific channel for transmitting the MBMS service in the second type of MBSFN cluster according to the received traffic channel information.

S70: According to the obtained information of the specific channel for transmitting the MBMS service in the second type of MBSFN cluster and the obtained Cell Parameter ID information, the UE receives the MBMS service transmitted over the channel of the second type of MBSFN cluster by demodulating the contents in the Cell Parameter ID of the traffic slot of the second type of MBSFN cluster.

As shown in the above processing, by synchronizing with the searched out MBSFN cluster and receiving the MBMS service of the MBSFN cluster, the UE is enabled to receive the MBMS service in the MBSFN cluster.

In the above implementation, the UE in the coverage of the non-MBSFN cell 1 may receive the MBMS service in the second type of MBSFN cluster; likewise, the UE in the coverage of the non-MBSFN cell 1 may also receive the MBMS service in the first type of MBSFN cluster.

Figure 7:
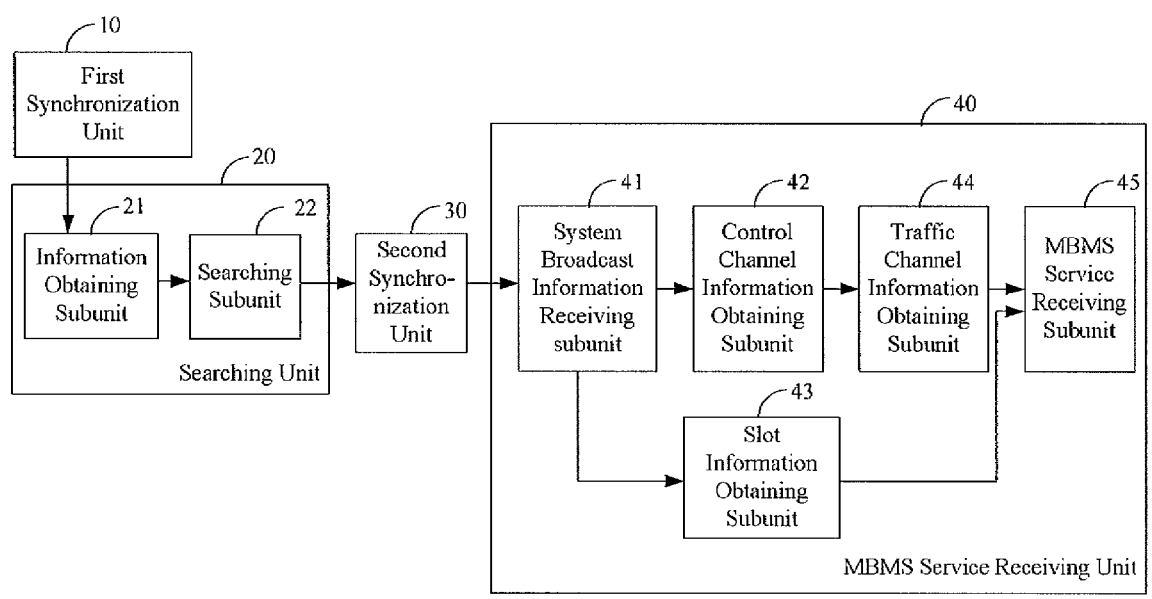
FIG. 7 is a schematic diagram showing the structure of a User Equipment according to an embodiment of the invention.

As shown in FIG. 7, the structure of a User Equipment according to an embodiment of the invention may include:

a first synchronization unit 10, which is adapted to synchronize with a non-MBSFN cell associated with the MBSFN clusters described above when the User Equipment is required to receive an MBMS service from one of the MBSFN clusters;

a searching unit 20, which is adapted to search for the MBSFN cluster according to indication of system information in the non-MBSFN cell in synchronization with the first synchronization unit 10;

a second synchronization unit 30, which is adapted to synchronize with the MBSFN cluster searched out the by searching unit 20; and an MBMS service receiving unit 40, which is adapted to receive the MBMS service from the MBSFN cluster in synchronization with the second synchronization unit 30.

The searching unit 20 may include:

an information obtaining subunit 21, which is adapted to obtain information of an MBSFN cluster associated with the non-MBSFN cell in synchronization with the first synchronization unit from system broadcast information of the non-MBSFN cell; and a searching subunit 22, which is adapted to search for a corresponding MBSFN cluster using the information of the MBSFN cluster obtained by the information obtaining subunit 21.

The searching subunit 22 searches for the corresponding MBSFN cluster by matching a code block ID in the obtained information of an MBSFN cluster with a wireless signal received at the operation frequency of the MBSFN cluster.

The MBMS service receiving unit 40 may include:

a system broadcast information receiving subunit 41, which is adapted to receive system broadcast information of the MBSFN cluster in synchronization with the second synchronization unit 30;

a control channel information obtaining subunit 42, which is adapted to obtain information of a MBMS point-to-multipoint control channel from the system broadcast information received by the system broadcast information receiving subunit 41;

a slot information obtaining subunit 43, which is adapted to obtain information of a slot used for transmitting the MBMS service from the system broadcast information received by the system broadcast information receiving subunit 41;

a traffic channel information obtaining subunit 44, which is adapted to jump to a corresponding control channel to obtain information of a traffic channel for transmitting the MBMS service, according to information of the MBMS point-to-multipoint control channel obtained by the control channel information obtaining subunit 42; and a MBMS service receiving subunit 45, which is adapted to receive the MBMS service from the MBSFN cluster in synchronization with the UE, according to the information of the slot used for transmitting the MBMS service obtained by the slot information obtaining subunit 43 and the information of the traffic channel for transmitting the MBMS service obtained by the traffic channel information obtaining subunit 44.

An embodiment of the present invention further provides a Radio Network Controller, including: a storage unit, which is adapted to store association information between a non-MBSFN cell and an MBSFN cluster; and an information distribution control unit, which is adapted to control a corresponding non-MBSFN cell to carry, in the distributed system broadcast information, information of the MBSFN cluster associated with the non-MBSFN cell, according to the association information stored in the storage unit.

In the invention, the UE is synchronized with the non-MBSFN cell associated with the MBSFN cluster and searches for a corresponding MBSFN cluster according to indication of system information in the non-MBSFN cell in synchronization with the UE, subsequently, the UE is synchronized with the searched out MBSFN cluster, and receives the MBMS service from the MBSFN cluster in synchronization with the UE. Therefore, the embodiments of the present invention provide a method for searching for a desired MBSFN cluster from the proposed MBSFN clusters where the MBMS service is transmitted based on the above-described two types of physical layer frame structures, and a method for receiving the MBMS service from the searched out MBSFN cluster, thereby enabling the UE to receive the MBMS service from the MBSFN cluster.

It will be appreciated by those skilled in the art that various modifications and alterations may be made to the invention without departing from the scope of the invention. Thus, if the various modifications and alterations fall in the scope of the invention defined in the appended claims and equivalents thereof, all the modifications and alterations are intended to be covered by the invention.

The invention claimed is:

1. A method for searching for a Multimedia Broadcast/Multicast Service over Single Frequency Network (MBSFN) cluster, the method comprising:

synchronizing firstly a User Equipment with a non-MBSFN cell associated with at least one type of physical layer frame structures of the MBSFN cluster when the User Equipment is required to receive an Multimedia Broadcast/Multicast Service (MBMS) service from the at least one type of the MBSFN cluster, wherein association between the non-MBSFN cell and the at least one type of the MBSFN cluster is predefined by a Radio Network Controller; and searching for the at least one type of the MBSFN cluster according to indication of system broadcast information in the non-MBSFN cell, wherein the searching for the at least one type of the MBSFN cluster according to indication of system broadcast information in the non-MBSFN cell comprises:

obtaining, by the User Equipment, information of the at least one type of the MBSFN cluster from the system broadcast information broadcasted by the non-MBSFN cell, wherein the information of the at least one type of the MBSFN cluster comprises type, frequency information, and Cell Parameter ID of the at least one type of MBSFN cluster;

searching for the at least one type of MBSFN cluster using the obtained information;

synchronizing secondly the at least one type of the MBSFN cluster searched out by the searching step; and receiving the MBMS service from the at least one type of the MBSFN cluster in synchronization with the second synchronization, wherein the MBMS service receiving unit comprises:

a system broadcast information receiving subunit, configured to receive system broadcast information of the at least one type of the MBSFN cluster in synchronization with the second synchronization unit;

a control channel information obtaining subunit, configured to obtain information of a MBMS point-to-multipoint control channel from the system broadcast information received by the system broadcast information receiving subunit;

a slot information obtaining subunit, configured to obtain information of a slot used for transmitting the MBMS service from the system broadcast information received by the system broadcast information receiving subunit;

a traffic channel information obtaining subunit, configured to jump to a corresponding control channel to obtain information of a traffic channel for transmitting the MBMS service, according to information of the MBMS point-to-multipoint control channel obtained by the control channel information obtaining subunit; and a MBMS service receiving subunit, configured to receive the MBMS service from the at least one type of the MBSFN cluster in synchronization with the User Equipment, according to the information of the slot used for transmitting the MBMS service obtained by the slot information obtaining subunit and the information of the traffic channel for transmitting the MBMS service obtained by the traffic channel information obtaining subunit.

2. The method of claim 1, wherein different MBMS services are transmitted in different types of MBSFN clusters, wherein when the obtained information corresponds to at least two types of MBSFN clusters, the User Equipment determines the MBSFN cluster type to be searched for according to the MBMS service selected by a user of the User Equipment.

3. The method of claim 1, wherein different frame structures for transmitting an MBMS service are configured in different types of MBSFN clusters, and wherein when the obtained information corresponds to at least two types of MBSFN clusters, the User Equipment determines the MBSFN cluster type to be searched for according to a frame structure for transmitting the MBMS service that is supported by the User Equipment.

4. The method of claim 1, wherein the searching for the at least one type of the MBSFN cluster using the obtained information comprises:

determining the MBSFN cluster type to be searched for; and searching for the at least one type of the MBSFN cluster by matching a Cell Parameter ID corresponding to the MBSFN cluster type to be searched for in the obtained information with a Cell Parameter ID in a received wireless signal from the MBSFN cluster.

5. A method for receiving a Multimedia Broadcast/Multicast Service (MBMS), comprising:

synchronizing a User Equipment with a non-Multimedia Broadcast/Multicast Service over Single Frequency Network (non-MBSFN) cell associated with at least one type of physical layer frame structures of a MBSFN cluster when the User Equipment is required to receive an MBMS service from at least one type of the MBSFN cluster, wherein association between the non-MBSFN cell and the at least one type of the MBSFN cluster is predefined by a Radio Network Controller;

searching for the at least one type of the MBSFN cluster according to indication of system broadcast information in the non-MBSFN cell;

synchronizing the User Equipment with the searched out the at least one type of the MBSFN cluster; and receiving the MBMS service from the at least one type of the MBSFN cluster in synchronization with the User Equipment, wherein the searching for the at least one type of the MBSFN cluster according to indication of system broadcast information in the non-MBSFN cell comprises:

obtaining, by the User Equipment, information of the at least one type of the MBSFN cluster from the system broadcast information broadcasted by the non-MBSFN cell, wherein the information of the at least one type of the MBSFN cluster comprises type, frequency information, and Cell Parameter ID of the at least one type of the MBSFN cluster; and searching for the at least one type of the MBSFN cluster using the obtained information, wherein the receiving the MBMS service from the at least one type of the MBSFN cluster in synchronization with the User Equipment comprises:

receiving, by the User Equipment, system broadcast information from the at least one type of the MBSFN cluster in synchronization with the User Equipment;

obtaining MBMS point-to-multipoint control channel information and information of a slot for transmitting the MBMS service from the received system broadcast information;

jumping, by the User Equipment, to a corresponding control channel to obtain information of a channel for transmitting the MBMS service, according to the obtained MBMS point-to-multipoint control channel information; and receiving, by the User Equipment, the MBMS service from the at least one type of the MBSFN cluster in synchronization with the User Equipment, according to the obtained information of the slot for transmitting the MBMS service and the obtained information of the channel for transmitting the MBMS service.

6. A User Equipment, comprising:

a first synchronization unit, configured to synchronize with a non-Multimedia Broadcast/Multicast Service over Single Frequency Network (non-MBSFN) cell associated with at least one type of physical layer frame structures of a MBSFN cluster when the User Equipment is required to receive an Multimedia Broadcast/Multicast Service (MBMS) service from the at least one type of the MBSFN cluster, wherein association between the non-MBSFN cell and the at least one type of the MBSFN cluster is predefined by a Radio Network Controller;

a searching unit, configured to search for the at least one type of the MBSFN cluster according to indication of system information in the non-MBSFN cell in synchronization with the first synchronization unit, wherein the searching unit comprises:
an information obtaining subunit, configured to obtain information of the at least one type of the MBSFN cluster from the system information broadcasted by the non-MBSFN cell, wherein the information of the at least one type of the MBSFN cluster comprises type, frequency information, and Cell Parameter ID of the at least one type of MBSFN cluster; and
a searching subunit, configured to search for the at least one type of the MBSFN cluster using the information obtained by the information obtaining subunit;

a second synchronization unit, configured to synchronize with the at least one type of the MBSFN cluster searched out by the searching unit;

an MBMS service receiving unit, configured to receive the MBMS service from the at least one type of the MBSFN cluster in synchronization with the second synchronization unit, wherein the MBMS service receiving unit comprises:
a system broadcast information receiving subunit, configured to receive system broadcast information of the at least one type of the MBSFN cluster in synchronization with the second synchronization unit;
a control channel information obtaining subunit, configured to obtain information of a MBMS point-to-multipoint control channel from the system broadcast information received by the system broadcast information receiving subunit;
a slot information obtaining subunit, configured to obtain information of a slot used for transmitting the MBMS service from the system broadcast information received by the system broadcast information receiving subunit;
a traffic channel information obtaining subunit, configured to lump to a corresponding control channel to obtain information of a traffic channel for transmitting the MBMS service, according to information of the MBMS point-to-multipoint control channel obtained by the control channel information obtaining subunit; and
a MBMS service receiving subunit, configured to receive the MBMS service from the at least one type of the MBSFN cluster in synchronization with the User Equipment, according to the information of the slot used for transmitting the MBMS service obtained by the slot information obtaining subunit and the information of the traffic channel for transmitting the MBMS service obtained by the traffic channel information obtaining subunit.

7. The User Equipment of claim 6, wherein the searching subunit is further configured to determine an MBSFN cluster type to be searched for and to search for the one type of MBSFN cluster by matching a Cell Parameter ID corresponding to the MBSFN cluster type to be searched for in the obtained information with a Cell Parameter ID in a received wireless signal from an MBSFN cluster.

8. A system for searching for a Multimedia Broadcast/Multicast Service over Single Frequency Network (MBSFN) cluster and receiving a Multimedia Broadcast/Multicast Service (MBMS), the system comprising:
a Radio Network Controller, comprising:
a storage unit, configured to store association information between a non-Multimedia Broadcast/Multicast Service over Single Frequency Network (non-MBSFN) cell and at least one type of physical layer frame structures of the MBSFN cluster;
an information distribution control unit, which is configured to control the non-MBSFN cell to carry, in distributed system broadcast information, information of the at least one type of the MBSFN cluster, according to the stored association information,
wherein the information of the at least one type of the MBSFN cluster comprises type, frequency information, and Cell Parameter ID of the at least one type of the MBSFN cluster, wherein an association table is provided in a Radio Network Controller through an operation and maintenance platform so that the non-MBSFN cell is associated with the MBSFN cluster; and
a User Equipment, comprising:
a first synchronization unit, configured to synchronize with the non-MBSFN cell associated with the at least one type of the MBSFN cluster when the User Equipment is required to receive the MBMS service from the at least one type of the MBSFN cluster, wherein association between the non-MBSFN cell and the at least one type of the MBSFN cluster is predefined by a Radio Network Controller,
a searching unit, configured to search for the at least one type of the MBSFN cluster according to indication of system information in the non-MBSFN cell in synchronization with the first synchronization unit,
wherein the searching unit comprises:
an information obtaining subunit, configured to obtain information of the at least one type of the MBSFN cluster from the system information broadcasted by the non-MBSFN cell, wherein the information of the at least one type of the MBSFN cluster comprises type, frequency information, and Cell Parameter ID of the at least one type of MBSFN cluster; and
a searching subunit, configured to search for the at least one type of the MBSFN cluster using the information obtained by the information obtaining subunit;
a second synchronization unit configured to synchronize with the at least one type of the MBSFN cluster searched out by the searching unit; and
an MBMS service receiving unit configured to receive the MBMS service from the at least one type of the MBSFN cluster in synchronization with the second synchronization unit, wherein the MBMS service receiving unit comprises:
a system broadcast information receiving subunit configured to receive system broadcast information of the at least one type of the MBSFN cluster in synchronization with the second synchronization unit;
a control channel information obtaining subunit configured to obtain information of a MBMS point-to-multipoint control channel from the system broadcast information received by the system broadcast information receiving subunit;
a slot information obtaining subunit configured to obtain information of a slot used for transmitting the MBMS service from the system broadcast information received by the system broadcast information receiving subunit;

a traffic channel information obtaining subunit configured to lump to a corresponding control channel to obtain information of a traffic channel for transmitting the MBMS service, according to information of the MBMS point-to-multipoint control channel obtained by the control channel information obtaining subunit; and a MBMS service receiving subunit configured to receive the MBMS service from the at least one type of the MBSFN cluster in synchronization with the User Equipment, according to the information of the slot used for transmitting the MBMS service obtained by the slot information obtaining subunit and the information of the traffic channel for transmitting the MBMS service obtained by the traffic channel information obtaining subunit.

\* \* \* \* \*